3,399,232
DINITROCARBOXAMIDES
Marvin H. Gold, Sacramento, and Henry J. Marcus, West Covina, Calif., assignors to Aerojet-General Corporation, Azusa, Calif., a corporation of Ohio
No Drawing. Original application Nov. 26, 1963, Ser. No. 326,286, now Patent No. 3,359,334. Divided and this application Nov. 4, 1966, Ser. No. 616,149
2 Claims. (Cl. 260—562)

ABSTRACT OF THE DISCLOSURE

This patent describes novel compounds having the general formula

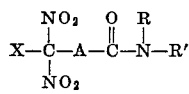

which are prepared in accordance with the following general reaction equation

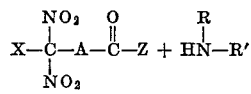

wherein A is an alkylene radical, preferably containing from 1 to about 20 carbon atoms; R and R' are the same or different and are selected from the group consisting of hydrogen, hydrocarbyl, preferably alkyl or aryl having from 1 to about 12 carbons, or ω-hydroxyalkyl; X is chloro or bromo; and Z is chloro, bromo, or hydroxy, useful as high explosives.

---

This application is a divisional of U.S. application Ser. No. 326,286, filed Nov. 26, 1963, now U. S. Patent 3,359,334, the disclosure of which is expressly incorporated herein by reference.

It is an object of this invention to prepare certain novel organic compounds.

It is another object of the present invention to provide a new process for preparing nitro compounds.

These and other objects and advantages of the invention will become apparent from the more detailed description which follows.

The compounds of the present invention and falling within the scope of the above formula include N-butly-3-chloro-3,3-dinitropropionamide, N-decyl-5-chloro-5,5-dinitropentanamide, N-ω-hydroxyethyl-4-dinitrobutyramide, N,N-diethyl-4-chloro-4,4-dinitrobutyramide, 4-bromo-4,4-dinitrobutyranilide and N-ethyl-4-chloro-4,4-dinitrobutyramide.

The reaction is conveniently carried out in any inert polar or non-polar solvent in which the reactants are soluble, i.e., water, methanol, ethanol, benzene, chloroform, etc. The proportions of the reactants employed in the reaction are not critical. Normally, stoichiometrically equivalent amounts are used since this results in the most economical utilization of the reactants. The reaction temperaure should normally be sufficiently high so that the reactants will dissolve to a substantial degere in the reaction medium, but in any event, the reaction temperature should be below the composition temperature of the reactant. Normally, the reaction is conducted at a temperature between about −20° C. and about +120° C. The most preferred temperature is from about −10° C. to +50° C. Pressure is not critical in this reaction. Therefore, while any pressure can be used, the reaction is normally run under atmospheric pressure. Agitation of the reactants such as by mechanical stirrer, while desirable in that it increases the reaction rate, is not necessary. The novel compounds of this invention may be isolated in conventional manner such as by extraction, distillation and/or filtration.

To more clearly illustrate our invention the following examples are presented. It is, to be understood, however, that these examples are intended merely as an illustrative embodiment of the invention. In the examples, the percentages are by weight unless otherwise indicated.

Example I.—4-bromo-4,4-dinitrobutyranilide

Fifteen grams (0.058 M) 4-bromo-4,4-dinitrobutyric acid and thirty milliliters (0.42 M) thionyl chloride were refluxed for 45 minutes. The excess thionyl chloride was removed under vacuum, and the acid chloride recovered by distillation. A solution of 5.83 g. (0.0212 M) of the 4-bromo-4,4-dinitrobutyryl chloride in 10 ml. benzene was added gradually, over 45 minutes, to a solution of 3.72 g. (0.040 M) aniline in 7 ml. benzene at reflux. The precipitate which formed when the aniline solution was added tended to dissolve at the beginning, but complete solution was not attained. The mixture darkened as the reaction proceeded. The walls of the flask were rinsed with 5 to 10 ml. fresh benzene, and refluxing continued for thirty minutes. After cooling, an attempt to extract the aniline hydrochloride with water caused crystallization of the crude product in the separatory funnel. The anilide was dissolved with heating. The benzene solution, while still warm, was washed twice with water, boiled to remove water azeotropically, and, after cooling treated with an equal volume of hexane. The crude product was filtered, washed with hexane, and air-dried. Wt. 4.8 g. (68%) M.P. 116 to 121°. On standing, an additonal 0.3 g. (M.P. 90 to 126°) was collected from the mother liquor and washed. The crude, tan anilide (4.8 g.) was recrystallized from 70 ml. of isopropanol and 30 ml. water, and decolorized twice with charcoal. The product was very light yellow; wt. 2.9 g. (corresponding to a 43% yield) M.P. 133 to 135°. A small sample, recrystallized again from aqueous isopropanol, was still light yellow and melted at 134 to 136°.

*Elemental analysis.*—Calc'd: C, 36.16%; H, 3.04%; N, 12.65%; Br, 24.05%. Found: C, 36.75%; H, 3.23%; N, 12.46%; Br, 24.34%.

When the above example is repeated employing ethylamine in lieu of aniline and 4-chloro-4,4-dinitrobutyric acid in place of 4-bromo-4,4-dinitrobutyric acid, N-ethyl-4-chloro-4,4-dinitrobutyramide is obtained.

The compounds of this invention, which contain a plurality of nitro groups, are inherently useful as high explosive. These compounds can also be used in any conventional explosive missile, projectile, rocket or the like, as the main explosive charge. An example of such a missile is described in U.S. Patent 2,470,162, issued May 17, 1949. One way of using such high explosives in a device such as that disclosed in U.S. Patent 2,470,162 is to absorb the liquid explosive in an absorbent material such as cellulose, wood pulp, or sawdust. The resultant dynamite-type explosive can then be packed into the warhead of the missile. A charge thus prepared is sufficiently insensitively to withstand the shock entailed in the ejection of a shell from a gun barrel or a rocket launching tube under the pressure developed from ignition of a propellant charge, and can be caused to explode on operation of an impact or time-fuse mechanism firing a detonating explosive such as lead azide or mercury fulminate.

It will be understood that various modifications may be made in this invention without departing from the spirit thereof or the scope of the appended claims.

We claim:
1. A compound having the formula

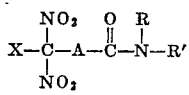

wherein A is an alkylene radical having from 1 to 3 carbon atoms, R and R' were selected from the group consisting of hydrogen, alkyl containing from 1 to 10 carbons, phenyl and ω-hydroxyalkyl containing 2 carbons, and X is selected from the group consisting of chloro and bromo.

2. The compound 4-bromo-4,4-dinitrobutyranilide.

References Cited

UNITED STATES PATENTS 3,076,845  2/1963  Clinton et al. _____ 260—562

OTHER REFERENCES

Klager, Analytical Chemistry, vol. 23, p. 534 (1951).

HENRY R. JILES, *Primary Examiner.*

H. I. MOATZ, *Assistant Examiner.*